United States Patent

[11] 3,596,539

| [72] | Inventor | Russell L. Gollaher<br>604 Baden Avenue, St. Louis, Mo. 63147 |
|---|---|---|
| [21] | Appl. No. | 831,356 |
| [22] | Filed | June 9, 1969 |
| [45] | Patented | Aug. 3, 1971 |

[54] TAPERED DRIFT PINS AND METHODS OF MAKING AND USING THE SAME
1 Claim, 4 Drawing Figs.

[52] U.S. Cl. .................................................. 81/3,
29/275, 254/104
[51] Int. Cl. ....................................................... B25b 27/00
[50] Field of Search ............................................. 81/3, 1;
254/104; 29/253, 275, 242, 243

[56] References Cited
UNITED STATES PATENTS

| 1,395,209 | 10/1921 | Schultz | 254/104 |
| 1,828,142 | 10/1931 | Herdman | 81/1 X |
| 2,542,368 | 2/1951 | Smith | 254/104 |
| 3,149,414 | 9/1964 | Bell | 254/104 |

Primary Examiner—Robert C. Riordon
Assistant Examiner—Roscoe V. Parker, Jr.
Attorney—Roger M. Hibbits ABSTRACT: A tapered drift pin comprising an elongated member provided with a plurality of tapered sections for use with various sized machines.

PATENTED AUG 3 1971  3,596,539
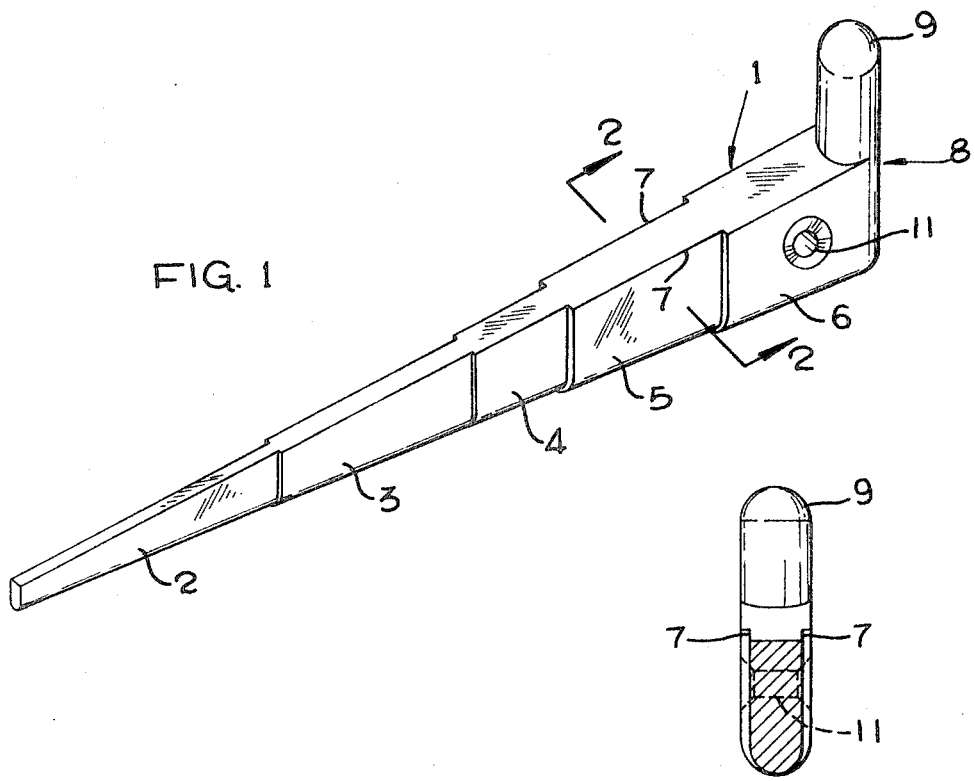
FIG. 1
FIG. 2
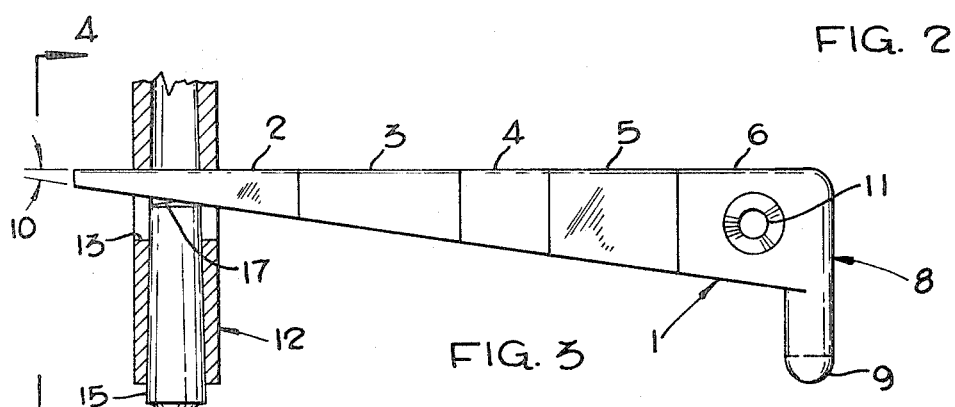
FIG. 3
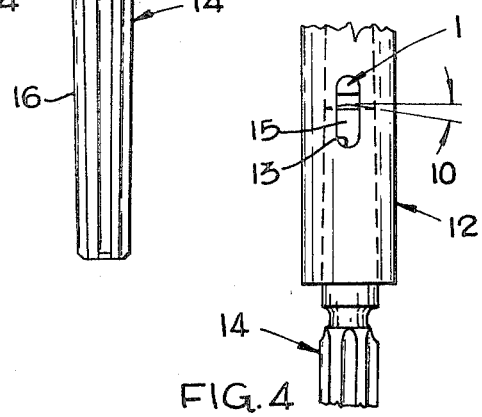
FIG. 4
Inventor
RUSSELL L. GOLLAHER
By Roger M. Hibbits
Attorney

TAPERED DRIFT PINS AND METHODS OF MAKING AND USING THE SAME

BACKGROUND OF THE INVENTION

In the field of machine tools, such tools as drills, reamers and the like are commonly provided with a tapered shank meant to be force fit into an axially tapered spindle. Considerable force is generally required to remove the tool and this is usually accomplished with a drift pin. Use of a drift pin is facilitated by providing a slot in the wall of the spindle in the vicinity of the end of the shank of such tools. Such a slot is generally an axially elongated aperture which allows for variation in the length of the shank of different tools.

To remove a tool from such a spindle requires insertion of the tapered drift pin through the slot with contact being thereby made with the end of the shank of a tool. The pin is then pounded into the slot until the tool is freed.

To minimize damage to the shank end of the tool it is usually provided with a radially tapered end. The drift pin most desirable in this situation is one which is provided with a taper which matches the radial taper provided on the shank end of the tool.

It is commonplace in machinery operations such as those contemplated by the present invention to find sets of drift pins for use with various sizes of machines and tools. It is contemplated herein to provide a tapered drift pin which is provided with a plurality of tapered sections to allow use with a wide range of machines and tools.

SUMMARY OF THE INVENTION

It is therefore an object of the present invention to provide a tapered drift pin for use on machines which are provided with varying sized slots in the spindles thereof. Thus allowing use on many machines rather than having a separate drift pin for each machine.

Another object of the present invention is to provide a tapered drift pin which is provided with a suitable base portion for pounding thereon which will increase the useful life of said drift pin.

A further object of the present invention is to provide a tapered drift pin wherein such taper matches the radial taper of conventional drill bits and similar tools so as to minimize the damage to the shank portion of such tools.

These together with other objects and advantages, which will become subsequently apparent, reside in the details and construction and operation as more fully hereinafter described and claimed, reference being had to the accompanying drawings forming a part hereof, wherein like numerals refer to like parts throughout, and in which;

BRIEF DESCRIPTION OF THE DRAWINGS

In the drawings:

FIG. 1 is a perspective view of a tapered drift pin constructed in accordance with and embodying the present invention.

FIG. 2 is a sectional view of the tapered drift pin shown in FIG. 1.

FIG. 3 is a fragmentary sectional view of a particular use of the tapered drift pin shown in FIG. 1.

FIG. 4 is a fragmentary elevation view of the equipment shown in FIG. 2.

DETAILED DESCRIPTION OF THE INVENTION

Referring now in more detail and by reference characters to the drawings which illustrate practical embodiments of the present invention, FIG. 1, designates in perspective the tapered drift pin constructed in accordance with and embodying the present invention.

As shown in FIG. 1 and FIG. 2, tapered drift pin, 1, comprises a plurality of tapered sections, 2, 3, 4, 5, and 6. The cross section of each tapered section is essentially comprised of two parallel sides a top edge which is essentially a straight edge and a bottom arcuate edge. Edges, 7, of each tapered section are essentially parallel to each other and to the corresponding edges of other sections. Base portion, 8, of said tapered drift pin, 1, is provided with an extending portion, 9. Tapered drift pin, 1, is also provided with aperture, 11, for mounting on a suitable peg when the tool is not being used.

In a typical application, the width of the various sections, (the distance between edges, 7,) would be as follows: Section, 2, of width 0.200 inches, section 3, width 0.250 inches, section 4, width 0.310 inches, section 5, width 0.468 inches, and section 6, width 0.625 inches. Tapered drift pin, 1, may be provided with more or less sections and with different sizes than those shown in the drawings.

FIG. 3 illustrates the use of tapered drift pin, in conjunction with a reamer, 14, mounted in spindle, 12. Reamer, 14, is comprises of cutting portion, 16, and shank portion, 15. Shank portion, 15, is provided with a radial taper at end, 17. The radial taper of end, 17, of shank portion, 15, is matched with taper angle, 10, of tapered drift pin, 1. Typically taper angle, 10, is 8° and 19 minutes. It is clear that by matching the taper angle, 10, of drift pin, 1, with the taper of the shank, 15, will minimize damage to said shank when tapered drift pin, 1, is pounded on base portion, 8, to free reamer, 14, from spindle, 12.

FIG. 4 shows an elevation view of the equipment shown in FIG. 3 and at right angles to the view in FIG. 3. FIG. 3 and FIG. 4 together clearly illustrate slot, 13, which is an elongated slot of the type typically provided in spindles in the field of use contemplated by the present invention, as well as the relationship of tapered drift pin, 1, with slot, 13, spindle, 12, and reamer, 14.

It should be understood that changes and modifications in the form, construction, arrangement, and combination of the elements of the tapered drift pins and methods of making and using the same may be made and substituted for those herein shown and described without departing from the nature and principle of my invention.

Having thus described by invention, what I claim and desire to secure by United States Letters Patent is:

1. A multipurpose drift pin for use in removing tapered shank tools, comprising an elongated tapered body portion provided with a plurality of tapered sections of varying thicknesses, said tapered sections each being of essentially uniform thickness.